United States Patent [19]

Wang et al.

[11] Patent Number: 5,391,365

[45] Date of Patent: * Feb. 21, 1995

[54] PROCESS FOR PRODUCING MANGANESE DIOXIDE

[75] Inventors: Enoch I. Wang, Mansfield, Mass.; William L. Bowden, Nashua, N.H.; Paul Gionet, Lowell, Mass.

[73] Assignee: Duracell Inc., Bethel, Conn.

[ * ] Notice: The portion of the term of this patent subsequent to Jan. 11, 2011 has been disclaimed.

[21] Appl. No.: 153,259

[22] Filed: Nov. 16, 1993

Related U.S. Application Data

[63] Continuation-in-part of Ser. No. 952,034, Sep. 28, 1992, Pat. No. 5,277,890.

[51] Int. Cl.$^6$ ............................................. C01G 45/02
[52] U.S. Cl. ....................................... 423/605; 423/50; 429/224
[58] Field of Search ................. 423/50, 605; 429/224

[56] References Cited

U.S. PATENT DOCUMENTS

| | | | |
|---|---|---|---|
| 2,956,860 | 10/1960 | Welsh | 423/605 |
| 4,277,360 | 7/1981 | Mellors | 423/605 |
| 4,959,282 | 9/1990 | Dahn et al. | 423/605 |
| 5,069,988 | 12/1991 | Tomantschger et al. | 429/224 |

*Primary Examiner*—Mark L. Bell
*Assistant Examiner*—Deborah Jones
*Attorney, Agent, or Firm*—Ronald S. Cornell; Edward M. Corcoran; Barry D. Josephs

[57] ABSTRACT

The invention relates to the manufacture of manganese dioxide by a chemical process. The resulting manganese dioxide product takes the form of particles characterized by filament-like protrusions jutting out from its surface. The manganese dioxide particles having such surface features can be manufactured by reacting manganese sulfate with sodium peroxodisulfate in an aqueous solution. The process can be controlled to yield manganese dioxide of varying density and surface area. The manganese dioxide formed in the process can be deposited directly onto the surface of electrolytic manganese dioxide (EMD) or onto the surface of other particles. The manganese dioxide product is particularly suitable for use as a cathode active material in electrochemical cells.

24 Claims, No Drawings

PROCESS FOR PRODUCING MANGANESE DIOXIDE

This is a continuation in part of patent application Ser. No. 07/952,034, filed Sep. 28, 1992, now U.S. Pat. No. 5,277,890.

The invention relates to a process for production of manganese dioxide, particularly for use as a cathode active material in electrochemical cells.

In U.S. patent application Ser. No. 07/952,034 there is disclosed a process for forming P-CMD which is a chemically produced manganese dioxide having a density comparable to electrolytic manganese (EMD).

It is an object of the invention described herein to improve the control over physical characteristics, such as density, surface area, and activity of the p-CMD.

The present invention involves an improved process for production of battery grade chemical manganese dioxide (CMD). The CMD product of the invention when used in electrochemical cells, particularly alkaline and lithium cells, provides these cells with higher capacity and energy density per gram than are obtainable from the same cells employing electrolytic manganese dioxide (EMD). The process of the invention allows for greater control of properties such as density and surface area than is possible with present processes for the manufacture of conventional forms of EMD or CMD. The process of the invention therefore allows for production of high purity CMD which can be made to have properties more nearly optimal for a given electrochemical cell or battery type. A high density $MnO_2$ product is attainable having a density comparable to that of electrolytic manganese dioxide (EMD), yet the electrochemical activity of each $MnO_2$ particle is greater than that obtained from conventional EMD and CMD processes. The high electrochemical activity of each particle allows for better performance, particularly in lithium cells containing $MnO_2$. It is believed that the useful surface area which is accessible to the electrolyte is very high for p-CMD.

The process of the invention is disclosed in U.S. patent application Ser. No. 07/952,034, the content of which is incorporated herein by reference. In summary, the process involves production of battery grade manganese dioxide by reacting an aqueous solution of manganese sulfate with sodium peroxodisulfate.

The reaction may be represented as follows:

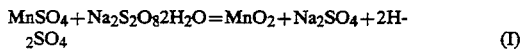

$$MnSO_4 + Na_2S_2O_8 \cdot 2H_2O = MnO_2 + Na_2SO_4 + 2H_2SO_4 \quad (I)$$

When an aqueous solution of manganese sulfate ($MnSO_4$) is reacted with sodium peroxodisulfate ($Na_2S_2O_8$), a gamma crystal structure of $MnO_2$ is precipitated. The $MnO_2$ precipitate tends to form spherical particles having filament-like protrusions emanating from each particle surface. The filament-like protrusions are crystalline and radiate outwardly from the surface of each $MnO_2$ particle, more or less, and are uniformly distributed over the particle surface. The "filament-like" protrusions are characterized by an average length to width ratio between about 1:1 and 20:1, typically between about 3:1 and 10:1. A characteristic length of the "filament-like" protrusions is between 0.3 to 1 micron and a characteristic width is typically between 0.1 to 0.3 micron. These dimensions are measurable at a magnification of about 40,000 times actual size. The "filament-like" protrusions result in a highly active surface area of the $MnO_2$ particle.

The present invention permits the surface area and apparent density of p-CMD to be altered by regulating the rate of the above reaction (I). This can be accomplished by simply controlling the amount or rate of heat supplied to the reaction. Unlike the Sedema process the present reaction does not require a catalytic $MnO_2$ substrate for receiving the p-CMD. In fact no catalyst is required and the $MnO_2$ product forms into dense, discrete particles without the need of a substrate material. However, it has been discovered that the reaction mixture can be seeded with almost any nonreactive solid material including metals and such material will act as a substrate for the p-CMD. That is, the $MnO_2$ reaction product will precipitate directly on the solid material.

In particular, it has been discovered that the above reaction mixture can be seeded with electrolytic manganese dioxide (EMD) particles and the $MnO_2$ reaction product will deposit directly on the EMD. This results in a very high density hybrid gamma $MnO_2$ whose outer surface comprises an $MnO_2$ coating having filament-like protrusions and active surface area, while the overall particle shape and interior structure is that characteristic of EMD. This hybrid form of $MnO_2$ may be used as cathode active material in conventional electrochemical cells, particularly alkaline or lithium cells. It has also been discovered that the reaction mixture can be advantageously seeded with chemical manganese dioxide (CMD), graphite or carbon black particles and metals. It can also be successfully seeded with other particles or substrates, for example $V_2O_5$, and $Bi_2O_3$. Such substrates may be in the form of particulate matter (e.g. powders), felt (e.g., graphite felt) or metal foil. In such case the $MnO_2$ reaction product will deposit directly onto the surface of these particles to form a hybrid particulate material which may be used as cathode active material in conventional electrochemical cells, particularly alkaline or lithium cells.

The above reaction (I) may typically be carried out in a temperature range between about 30° and 100° C., preferably between 70° and 90° C. After the reaction is complete, the $MnO_2$ precipitate is collected and rinsed with distilled water to remove residual acidity. It may then be dried at room temperature if its intended use is as a cathode active material in an alkaline cell. Alternatively, it may be dried at elevated temperature for more thorough drying, if its intended use is as cathode active material in a lithium cell. The resulting dry p-CMD has a high purity and low sodium content of less than about 500 ppm. The dry p-CMD contains at least 95% gamma $MnO_2$ in particulate form. Every $MnO_2$ particle made by the process of the invention, when observed between 200 and 10,000 times actual size, typically between 200 and 2000 times actual size, appears to have filament-like protrusions radiating outwardly from the particle surface and these protrusions appear to be uniformly distributed around the particle surface.

The p-CMD of the invention can be compacted and used as cathode material in conventional $Zn/MnO_2$ alkaline cells, or after heat treatment it may be used as cathode material in lithium cells. It results in a cell having increased capacity and energy density per gram than obtained with EMD cathode active material for the same cell.

It has been determined that the stoichiometric yield of $MnO_2$ can be dramatically increased to about 95% by slowly adding a suitable alkaline base to the reaction mixture. As the reaction proceeds the base reacts with the $HaSO_4$ as it forms, thereby improving the reaction kinetics and ultimate yield of $MnO_2$. The base may be selected from a wide range of components. For example, the base may be selected from amines, ammonium hydroxide and alkali metal and alkali earth metal hydroxides, carbonates, bicarbonates, and combinations thereof. The base may also be selected from or include alkali metal and earth metal salts of carboxylic acids (Lewis bases). A preferred base is $Li_2CO_3$. Alternative bases can be employed to react with the $H_2SO_4$ to produce the same increase in yield of $MnO_2$. Such compounds include $Na_2CO_3$, LiOH, NaOH and MgO. For ultimate use of the p-CMD in lithium cells it would be preferred to add compounds such as $Li_2CO_3$ and LiOH to the reaction mixture to increase yield. For ultimate use of the p-CMD in alkaline cells it would be preferred to add $Na_2CO_3$ or NaOH to the reaction mixture. If such compounds are added, they should be added slowly to the reaction mixture to prevent the pH of the mixture from abruptly increasing to a pH greater than about 5.

We have found that the bulk density S.A.D (Scott Apparent Density) and surface area B.E.T. (Brunauer, Emmett and Teller method) of p-CMD can be varied and controlled by adjusting the pH during the course of the above indicated reaction (I). The control of S.A.D can be accomplished by initially heating the reaction mixture so that formation of p-CMD nuclei begins. The starting reactant concentration, rate of heating and temperature profile affect the formation of nuclei before the first base addition. (P-CMD nuclei are $MnO_2$ particles made by the process of the invention but which are not yet fully formed.) At this point as the nucleation process continues a base is added. The base may be selected from any of the compounds above mentioned. Preferably the base added to the reaction is $Li_2CO_3$ or the combination of $Li_2CO_3$ and LiOH. The base neutralizes acid formed during reaction and therefore immediately increases pH of the reaction mixture. The pH of the reaction mixture can thus be easily altered to a "target pH" by the amount of base addition. (Target pH as used herein is the pH of the reaction mixture immediately after the first base addition.) The first base addition increases the rate of formation of p-CMD and leads to further p-CMD deposition onto existing nuclei. Both the starting concentration of reactants and the extent of nucleation before the first base addition affect the amount of base and target pH needed to achieve a desired density of p-CMD.

Subsequent base additions can be made, primarily for the purpose of increasing the yield of p-CMD. (Such subsequent base additions do not appear to significantly affect the p-CMD bulk density (S.A.D.) or B.E.T. surface area.) We have found that the bulk density (S.A.D.) of the final p-CMD can be easily regulated between about 7 $g/in^3$ (0.43 $g/cm^3$) and 32 $g/in^3$ (1.95 $g/cm^3$) if the target pH after the first base addition is between 0.2 and 5. Characteristically, a bulk density (S.A.D.) of the final p-CMD can be regulated to a value between about 12 $g/in^3$ (0.73 $g/cm^3$) and 30 $g/in^3$ (1.83 $g/cm^3$) if a target pH between about 2 and 3.2 is achieved after the first base addition. (The lower target pH results in the higher density (S.A.D.) and the higher target pH, results in the lower density (S.A.D.)). The lower pH appears to lead to more compact p-CMD particles, that is particles with less voids, and therefore higher bulk density (S.A.D). The more compact particles also result in lower B.E.T. surface area.

In order to specifically control the p-CMD surface area, the reaction mixture is initially heated for sufficient period to allow p-CMD nuclei to form. At the end of this period a base, preferably $Li_2CO_3$ and LiOH, is added to the mixture to achieve a desired target pH. We have found that the B.E.T. surface area of the p-CMD can be specifically controlled by adjusting the ratio of total LiOH to $Li_2CO_3$ added to the reaction mixture, while adding sufficient total base in order to achieve a target pH between 0.2 and 5, preferably between 2 and 3.2. We have discovered that as the ratio of total $Li_2CO_3$ to LiOH added to reaction (I) decreases, the B.E.T. surface area of p-CMD increases. For example, as the $Li_2CO_3$ to LiOH ratio decreases in a range from 10:1 to 1.9:1, the B.E.T surface area of p-CMD may characteristically increase from 15 to 52 $m^2/g$. Interestingly, by adding $Li_2CO_3$ and LiOH within the above ratio range, the B.E.T. surface area of p-CMD can be increased substantially over that achieved by adding $Li_2CO_3$ alone while yet achieving about the same density (S.A.D.) as that obtained by adding $Li_2CO_3$ alone.

The following examples illustrate the method of preparation of battery grade $MnO_2$ by the process of the invention. All parts are parts by weight unless specified otherwise.

EXAMPLE 1

High density gamma $MnO_2$ is prepared by the process of the invention as follows:

120 g of $MnSO_4 \cdot H_2O$ is dissolved in 1800 ml of distilled water. Then, stoichiometric amount of $Na_2S_2O_8$ (169 g) is added to the clear pinkish solution to form a reactant solution. While stirring, the solution is heated in about 2 hours from room temperature (20° C.) to 50° C. and is maintained at a temperature of 50° C. overnight (about 18 hrs) while continually stirring. This enhances the nucleation process. The reaction proceeds according to reaction (I) above referenced. The clear pinkish solution slowly turns brown and then eventually turns a black color as more $MnO_2$ is precipitated. After the 18 hour period the solution is then heated from about 50° C. at a constant rate of about 25° C. per hour for about 1 hour to a temperature of about 75° C. and is maintained at 75° C. for about 3 hours. The solution is then heated at constant rate of about 10° C. per hour for about 1 hour to a temperature of 85° C. and maintained at 85° C. for 1 hour. The solution is again heated at a constant rate 30° C. per hour for about ½ hour to a temperature of about 100° C. and maintained at 100° C. for about 1½ hours at which time the run is ended. The pH of the solution at the end of the run is less than 0.5. The solution is then cooled to room temperature (20° C.) in about one hour. The solution is filtered and the solid $MnO_2$ is continually rinsed with distilled water to remove residual acidity. The resulting black powder is dried at 100° C. to drive off surface water. The overall yield of $MnO_2$ is 41 g or 67% of theoretical yield.

The resulting product is battery grade $MnO_2$ at least 95% of which is verified by x-ray diffraction to be of the gamma crystalline structure. (No other type $MnO_2$ crystalline structure was detected, the 95% threshold being the limit of resolution of the x-ray diffraction analysis.) The resulting product (p-CMD) has a high bulk density of about 23 $g/in^3$ (1.4 $g/cm^3$) SAD (Scott Apparent Density). The p-CMD product is formed of substantially spherical particles having filament-like protrusions emanating from the surface of each particle. The filament-like protrusions are clearly visible with an electron microscope at 2,030×magnification.

EXAMPLE 2

Lower density gamma $MnO_2$ is prepared by the process of the invention as follows:

The gamma p-CMD of the invention is made in a similar manner as described in example 1, except that rate of heating is faster leading to smaller size and less dense particles. Specifically, the same method of preparation and conditions as in example 1 are employed except the reactant solution is heated from 50° C. to 100° C. at rate of about 17° C. per hour for a period of less than 5 hours, namely about 3 hours. Electron photomicrographs of the resulting p-CMD product reveal hair-like protrusions emanating from the surface of the p-CMD particles. These protrusions are visible in electron photomicrographs of the p-CMD taken at 2,000 to 10,000 times actual size. The p-CMD product had a bulk density of about 8.7 g/in$^3$ (0.53 g/cm$^3$) (Scott Apparent Density) and is at least 95% gamma $MnO_2$.

The $MnO_2$ particles as described in this example may be used as cathode active material in electrochemical cells, particularly alkaline and lithium cells. If intended for use in lithium cells, the gamma $MnO_2$ may be heated in conventional manner to convert the gamma $MnO_2$ to gamma-beta crystalline structure and to evaporate any residual moisture entrapped within the $MnO_2$ particles. The bulk density and surface area of p-CMD can be varied by adjusting and controlling the pH during the reaction forming p-CMD. Preferably base is added to control pH after the first heating step of the reactants and at several intervals thereafter. A procedure for controlling the bulk density and surface area of p-CMD are illustrated in the following examples:

EXAMPLES 3, 4 and 5

The reaction forming p-CMD is carried out in three different 2-liter beakers as three separate experiments, each one intended for targeted pH value of 2, 2.5 and 3.0, respectively, after the first base addition. 291.5 g of $MnSO_4 \cdot H_2O$ and stoichiometric amount of $Na_2S_2O_8$ (410.8 g) are dissolved in 1.8 liter of distilled water in each beaker. Each solution is heated from room temperature (20° C.) to 55° C. at about a constant rate over a period of 6 hours. During this time p-CMD nuclei form as the reaction (I) proceeds and $H_2SO_4$ by-product makes the solution acidic. At the end of this period the pH of the solution in each beaker is about 1.2. At this time $Li_2CO_3$ is added to each solution. The appropriate amount of $Li_2CO_3$ is added to achieve a target pH 2, 2.5, and 3.0, respectively (examples 3,4 and 5, respectively). After the $Li_2CO_3$ addition the solutions are kept at 55° C. for 18 hours while constantly mixing and then heated for an additional 8 hours at 60° C. The solutions are then allowed to return to room temperature while mixing. The solutions are then heated from room temperature (20° C.) to 70° C. over a period of 3 hours prior to a second addition of $Li_2CO_3$. The 70 g of $Li_2CO_3$ are then added to each solution. Finally the solutions are heated to 90° C. at a constant rate over a period of 4 hours while mixing. Each solution is then cooled to room temperature and filtered to obtain the p-CMD which is continuously rinsed with distilled water to remove residual acidity. The resulting black powder is dried at 100° C. to drive off surface water. The overall yield of $MnO_2$ in each case is 110 g or about 92 percent of theoretical yield.

The p-CMD obtained in each of the above cases after $Li_2CO_3$ addition to achieve a target pH of 2, 2.5 and 3.0 as described, exhibited a bulk density (Scott Apparent Density) of 29.4 g/in$^3$ (1.79 g/cm$^3$), 22.8 g/in$^3$ (1.39 g/cm$^3$) and 12.6 g/in$^3$ (0.77 g/cm$^3$), respectively and a surface area (B.E.T) of 23.14, 25.94, and 28.98 m$^2$/g, respectively.

The resulting product is at least 95% gamma $MnO_2$ (verified by x-ray diffraction) and exhibits the filament-like protrusions at magnification of 2000 times actual size. The gamma $MnO_2$ so produced (p-CMD) may be used as cathode material in alkaline or lithium cells. For use in lithium cells the p-CMD is first heat treated in conventional manner to convert the gamma $MnO_2$ to gamma-beta crystalline structure and to evaporate any residual moisture entrapped within the $MnO_2$ particles. The use of the heat treated p-CMD in lithium cells results in better performance than EMD.

EXAMPLE 6

The BET surface area of p-CMD can be varied by employing LiOH and $Li_2CO_3$ at different ratios for the base addition during reaction of $MnSO_4$ and $Na_2S_2O_8$. A procedure is set forth as follows:

$MnSO_4 \cdot H_2O$ (1166 g) and stoichiometric amount of $Na_2S_2O_8$ (1643 g) are dissolved in 8 liter of distilled water in a 12-liter flask. The solution is then heated from room temperature (20° C.) to 55° C. at a constant rate over a period of 6 hours while continuously stirring. During this period p-CMD nuclei form and the solution becomes acidic. At the end of this period the pH is 1.72. $Li_2CO_3$ (50 g) is then added and the pH changed from 1.72 to a target pH of 2.75. The solution is maintained at 55° C. for about 18 hours while continuously stirring. At the end of this period the pH decreased from 2.75 to 0.2. At this point in order to increase the yield of $MnO_2$, $Li_2CO_3$ (190 g) is added to the solution and the pH increased from 0.2 to 0.88. Then 28 g of LiOH is added to the solution without any observable change in the pH. The solution is then heated from 55° C. to 70° C. over a 4 hour period while continuously stirring. The pH of the solution at the end of this period is 0.94. $Li_2CO_3$ (40 g) is then added to the solution and no observable change in the pH occurs. The solution is maintained at 70° C. for 3 hours and then heated to 90° C. over a period of 4 hours. The p-CMD is then recovered and dried in the manner described in Example 3.

The ratio of $Li_2CO_3$/LiOH in this example, based on total amounts base added, is 10:1 and the BET surface area of the resulting p-CMD measures 15.5 m$^2$/g. (The BET surface area measurements are performed using a Quantachrome Automated Gas Sorption System.)

EXAMPLE 7-10

The above procedure (Ex. 6) is repeated in like manner but using other ratios of $Li_2CO_3$/LiOH (Exs. 7-10). It is found that the BET surface area of the p-CMD increases as the ratio of $Li_2CO_3$/LiOH decreases. The results are summarized in the following Table 1, wherein the ratios given are based on total amount of base added and the target pH is the pH achieved after the first base addition of $Li_2CO_3$.

TABLE 1

| Ex. | $Li_2CO_3$/LiOH | B.E.T Area (g/m2) | Total Base (g) |
| --- | --- | --- | --- |
| 7 | (only $Li_2CO_3$ added) | 12.2 | 402 |
| 6 | 10:1 | 15.5 | 280 |
| 8 | 7:1 | 20.3 | 480 |
| 9 | 2.3:1 | 23.4 | 330 |
| 10 | 1.9:1 | 51.6 | 350 |

The p-CMD produced in the above examples is at least 95% gamma $MnO_2$ (verified by x-ray diffraction) and exhibits the filament-like protrusions at magnification of 2000 times actual size. This p-CMD may be used as cathode material in alkaline or lithium cells as described in Example 3. It may be seen from the above Table 1 that the B.E.T surface area may be regulated from 15 m²/g to 52 m²/g by adjusting the $Li_2CO_3$/LiOH ratio correspondingly between 10:1 to 1.9:1.

EXAMPLE 11

This example demonstrates the use of EMD particles as a substrate for the precipitation of $MnO_2$ in accordance with the invention.

250 g of $MnSO_4H_2O$ is dissolved in 3 liters of distilled water in a 4 liter beaker by stirring. 352.2 g of $Na_2S_2O_8$ and 1 kg of EMD (from Kerr-McGee). are then added to the slightly pinkish clear solution.

The heating regimen is as follows. The whole mixture is first heated from room temperature (20° C.) to 50° C. in about 2 hours and held at this temperature for 18 hours while continually mixing. $Li_2CO_3$ (20 g) is then added to the mixture and as a result the pH increases from 0.25 to 0.50. The whole mixture is then heated slowly at constant rate for about 3 hours to a temperature of 60° C. at which point the pH is 0.35. $Li_2CO_3$ (10 g) is then added to the mixture causing the pH to increase from 0.35 to 0.45. The whole mixture is maintained at 60° C. for 2 hours whereupon $Li_2CO_3$ (10 g) is added causing the pH to increase from 0.44 to 0.78. The mixture is then heated slowly to 65° C. in 1 hour, whereupon $Li_2CO_3$ (12 g) is added causing the pH to increase from 0.73 to 0.81. Finally, the whole mixture is heated for another 1 and ½ hour to 77° C. Thereupon, the mixture is cooled to room temperature (20° C.) in about 3 hour.

The product is rinsed with distilled water until neutral. Then it is filtered and dried at 100° C. to remove surface water. The total yield of hybrid product is 1100 g and its bulk density is 30 g/in³ (1.83 g/cm³) (Scott Apparent Density). The product is a hybrid containing about 10 wt % of the deposited gamma $MnO_2$ and 90 wt % EMD.

The hybrid consists of gamma $MnO_2$ deposited uniformly over the surface of the individual EMD particles. Each particle of the hybrid retains the overall irregular shape of the EMD particle, but exhibits a surface formed of uniformly distributed filament-like protrusions characteristic of the gamma $MnO_2$ made in accordance with the process of the invention. The surface features of each hybrid $MnO_2$ particle exhibit filament-like protrusions visible at magnification of between about 400 and 4000 times actual size. The protrusions emanate from and uniformly cover the surface of each hybrid particle. This is the result of the deposition of the gamma $MnO_2$ onto the EMD particles. The hybrid $MnO_2$ so produced is especially useful as cathode active material in electrochemical cells.

Although the present invention has been described with reference to specific embodiments, it should be recognized that variations are possible within the scope of the invention. Therefore, the invention is not intended to be limited to specific embodiments, but rather is defined by the claims and equivalents thereof.

What is claimed is:

1. A process for the manufacture of a cathode for an electrochemical cell comprising the steps of:
    a) reacting a manganese salt and $Na_2S_2O_8$ in a solution to produce a reaction product mixture comprising a precipitate of gamma $MnO_2$;
    b) removing the gamma $MnO_2$ precipitate from said reaction product mixture;
    c) drying said precipitate; and
    d) compacting said precipitate.

2. The process of claim 1 wherein the solution is an aqueous solution and said aqueous solution during step a) is heated to a temperature between about 30° C. and 100° C.

3. The process of claim 1 further comprising the step of adding a compound to said solution, said compound reactive with acid produced by the reaction of said manganese salt and $Na_2S_2O_8$.

4. The process of claim 3 wherein said compound is a base.

5. A process for manufacture of gamma manganese dioxide comprising the steps of:
    a) reacting $MnSO_4$ and $Na_2S_2O_8$ in a solution to produce a reaction product mixture comprising a precipitate of gamma $MnO_2$;
    b) adding a compound to said solution, said compound being reactive with $H_2SO_4$;
    c) removing the gamma $MnO_2$ precipitate from said reaction product mixture; and
    d) drying said precipitate.

6. The process of claim 5 wherein the solution is an aqueous solution and said aqueous solution during step a) is heated to a temperature between about 30° C. and 100° C.

7. The process of claim 5 wherein said compound is added to said solution after a portion of said $MnSO_4$ has reacted with $Na_2S_2O_8$.

8. The process of claim 7 wherein the pH of said solution changes to a value between 0.2 and 5 by the addition of said compound.

9. The process of claim 5 wherein said compound is selected from the group consisting of amines, ammonium hydroxide, and alkali metal and alkali earth metal hydroxides, carbonates, bicarbonates, and alkali metal and alkali earth metal salts of carboxylylic acids (Lewis bases) and combinations thereof.

10. The process of claim 5 wherein said compound is selected from the group consisting of $Li_2CO_3$, $Na_2CO_3$, LiOH, NaOH and MgO and combinations thereof.

11. The process of claim 5 wherein said compound is selected from the group consisting of $Li_2CO_3$ and LiOH and combinations thereof.

12. The process of claim 5 wherein said compound comprises $Li_2CO_3$ and LiOH in a ratio of $Li_2CO_3$ to LiOH of less than 10:1.

13. The process of claim 5 wherein said compound comprises $Li_2CO_3$ and LiOH in a ratio of $Li_2CO_3$ to LiOH between about 10:1 and 1.9:1.

14. The process of claim 5 wherein the gamma $MnO_2$ precipitate is comprised of particles characterized by filament-like protrusions radiating outwardly from the surface of said particles.

15. The process of claim 14 wherein the filament-like protrusions are visible at a magnification between about 200 and 10,000 times actual size.

16. The process of claim 5 further comprising adding particulate material to said solution during or prior to step a), wherein the $MnO_2$ precipitate deposits on the surface of said particulate material.

17. The process of claim 16 wherein said particulate material is selected from the group consisting of $MnO_2$, carbon, $V_2O_5$, $Bi_2O_3$.

18. The process of claim 5 further comprising adding $MnO_2$ particles to said solution during or prior to step a), wherein the $MnO_2$ precipitate deposits on the surface of the $MnO_2$ particles.

19. The process of claim 5 further comprising adding electrolytic $MnO_2$ (EMD) particles to said solution during or prior to step a), wherein the $MnO_2$ precipitate deposits on the surface of the EMD particles.

20. The process of claim 5 further comprising adding carbon particles to said solution during or prior to step a), wherein the carbon particles are selected from the group consisting of graphite and carbon black and wherein the $MnO_2$ precipitate deposits on the surface of the carbon particles.

21. A process for manufacture of gamma manganese dioxide comprising the steps of:
 a) reacting $MnSO_4$ and a salt of peroxodisulfate in a solution to produce a reaction product mixture comprising a precipitate of gamma $MnO_2$;
 b) adding a compound to said solution, said compound being reactive with $H_2SO_4$;
 c) removing the gamma $MnO_2$ precipitate from said reaction product mixture; and
 d) drying said precipitate.

22. The process of claim 21 wherein the solution is an aqueous solution and said aqueous solution during step a) is heated to a temperature between about 30° C. and 100° C.

23. The process of claim 21 wherein said compound is added to said solution after a portion of said $MnSO_4$ has reacted with said peroxodisulfate.

24. The process of claim 21 wherein said compound is selected from the group consisting of amines, ammonium hydroxide, and alkali metal and alkali earth metal hydroxides, carbonates, bicarbonates, and alkali metal and alkali earth metal salts of carboxylylic acids (Lewis bases) and combinations thereof.

* * * * *